Jan. 17, 1967   W. E. ABRAHAMSON   3,299,165
TURN AROUND FOR CATALYST REACTOR
Filed June 24, 1963
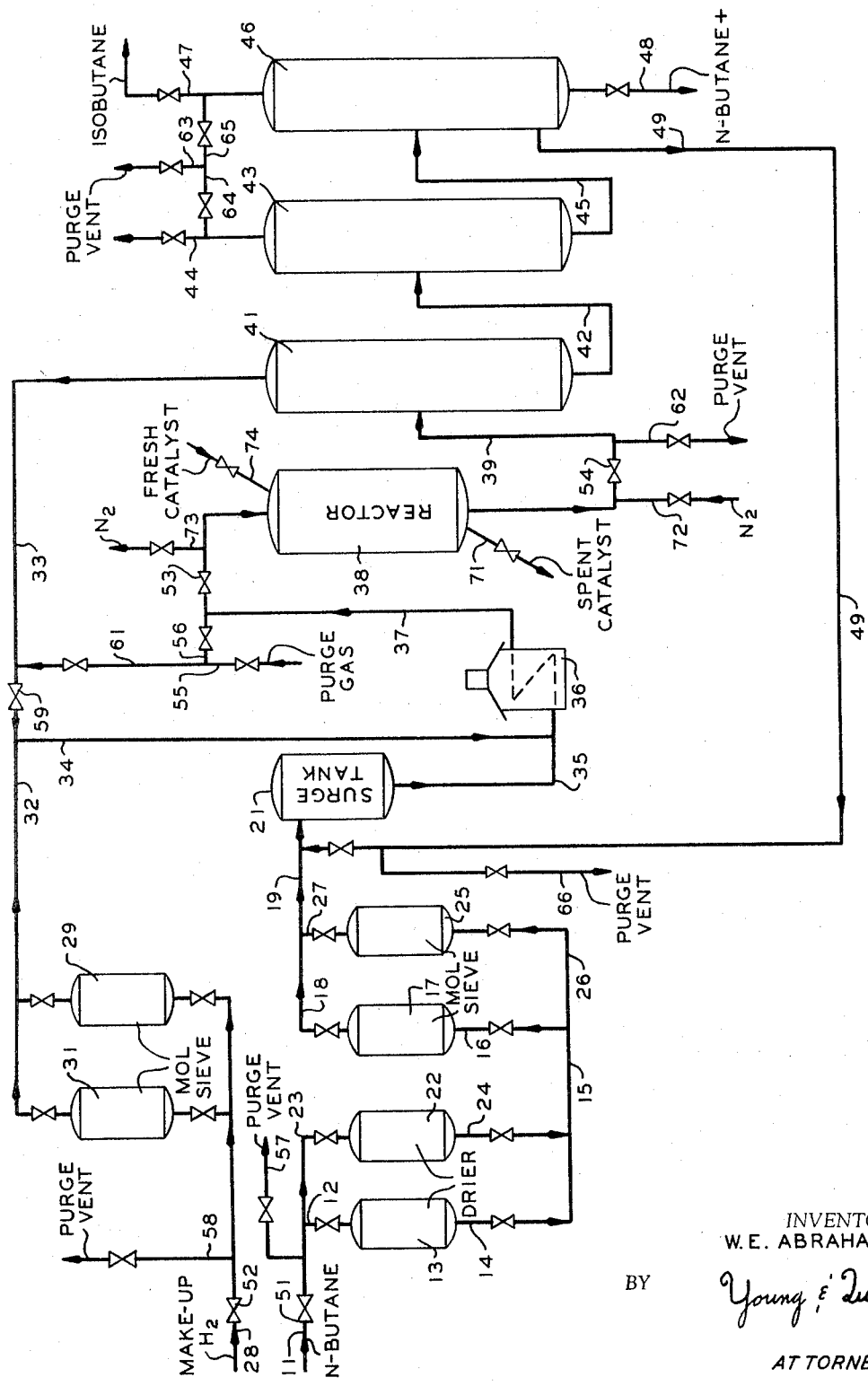
INVENTOR.
W. E. ABRAHAMSON
BY
*Young & Quigg*
ATTORNEYS United States Patent Office 3,299,165
Patented Jan. 17, 1967

3,299,165
TURN AROUND FOR CATALYST REACTOR
Wayne E. Abrahamson, Phillips, Tex., assignor to Phillips Petroleum Company, a corporation of Delaware
Filed June 24, 1963, Ser. No. 289,829
6 Claims. (Cl. 260—683.68)

This invention relates to an improved procedure for conducting turn around of a catalyst reactor system.

In the operation of a catalyst reactor the activity of the catalyst declines over a period of time until economic considerations dictate that the used catalyst be dumped and fresh catalyst loaded into the reactor. Previously the change in catalyst would be effected during a turn around, a period when the operation is shut down for inspection, repair, and/or modification. It is customary that the system be opened up during a turn around to permit inspection of the interior of various parts of the equipment. The exposure of the interior of the system to the atmosphere causes the formation of rust on the surfaces of steel components of the system. The atmosphere inside the system also contains moisture due to atmospheric humidity. This formation of rust and the presence of moisture within the system is a serious problem in catalytic reaction systems where water is a catalyst poison. While the present invention is applicable to any such system, for purposes of illustration, it will be described in terms of a system for isomerizing normal butane to isobutane utilizing a catalyst comprising alumina, platinum, and combined halogen with hydrogen chloride being utilized as a catalyst promoter. The aluminum-platinum-halogen catalyst is particularly sensitive to the presence of water to the extent that one pound of water will permanently poison approximately one hundred and twenty pounds of catalyst.

When new catalyst is to be charged during turn around in such a conventional butane isomerization system, the old catalyst would be dumped during the turn around and the system flanged up with the reactor empty. Then preliminary drying would be accomplished by circulating dry butane and hydrogen through the reaction system and the reaction product separation system. Following the preliminary drying, the reaction area would be pickled by injecting HCl into the hydrogen recycle stream. The pickling process would remove large portion of the rust or scale formed during turn around. Dry butane and hydrogen would be circulated after pickling was completed to remove water formed by the pickling and to dry the system as completely as possible by such means. After this final drying, the reactor would be cooled, evacuated, and purged, and then the new catalyst would be loaded into the reactor. However, it is extremely difficult to remove all of the rust and moisture from the system by means of the purging and pickling steps. Any rust remaining in the system would react with the hydrogen chloride to form water. This water, in addition to any traces of moisture, would then effect the permanent poisoning of a portion of the fresh catalyst, thus reducing the initial effective activity of the fresh catalyst as well as shortening the time before a new charge of catalyst will be required.

In accordance with the invention it has been discovered that the initial effective activity and life of the new catalyst can be preserved by leaving the old catalyst in place during the turn around period and subsequent start up operations and for a sufficient time thereafter for the normal HCl present in the hydrogen recycle stream to remove substantially all of the rust formed in the system during turn around and for the old catalyst to act as scavenger for the water thus formed as well as any moisture which entered the system during turn around operations. The old catalyst is dumped at the end of said sufficient time and new catalyst is charged to the reactor. The procedure in accordance with the invention not only maintains catalyst activity and increases catalyst life, but also eliminates the pickling and final drying steps normally required, thus effecting a reduction in the necessary down time for the system. The elimination of the pickling step is particularly desirable in avoiding the extremely corrosive conditions encountered in pickling.

Accordingly it is an object of the invention to provide an improved procedure for conducting a turn around for a catalyst reactor. Another object of the invention is to provide a system for preserving the effective activity of fresh catalyst and for prolonging the life of the fresh catalyst. Another object of the invention is to reduce the time required to effect a turn around of a catalyst reaction system involving a change of catalyst. A still further object of the invention is to minimize the loss of production resulting from a turn around in a catalyst reaction system involving a change of catalyst.

Other aspects, objects, and advantages of the invention will be apparent from a study of the disclosure, the drawing, and the appended claims to the invention.

Referring now to the drawing there is set forth a schematic representation of a catalytic reaction system for converting n-butane to isobutane. A normal butane feed stream is passed by way of conduits 11 and 12 into a dryer 13. The normal butane feed stock is generally a normally gaseous charge stock which is predominantly normal butane. It is preferable that the normal butane be present in amounts of at least 75% by weight of the feed stock and still more preferably in amounts of at least 90% by weight of the feed stock. As the feed to the isomerization reaction must be as free of water as possible, the fresh feed is contacted with a suitable desiccant, for example silica gel, in dryer 13. The dried feed is withdrawn from dryer 13 by way of conduit 14 and passed through conduits 15 and 16 into a molecular sieve 17 wherein the water content of the feed is further reduced to less than 1 p.p.m. by weight. The dried n-butane is withdrawn from molecular sieve 17 and passed by way of conduits 18 and 19 into a feed surge tank 21. A second silica gel dryer 22 can be connected between conduits 11 and 15 by means of conduits 23 and 24, respectively, and thus in parallel with dryer 13. Valves can be utilized in conduits 12, 14, 23 and 24 to permit utiliziation of one of dryers 13 and 22 on stream while the other dryer is being regenerated. Similarly a molecular sieve 25 can be connected in parallel with molecular sieve 17 by means of conduits 26 and 27, with conduits 16, 18, 26 and 27 containing suitable valve arrangements for permitting one of the molecular sieves to be utilized on stream while the other is being regenerated. As regeneration systems for silica gel dryers and molecular sieves are well known in the art the details thereof have been omitted for the sake of simplicity. While two silica gel dryers and two molecular sieves have been illustrated, any suitable number in any desired arrangement can be utilized.

Make-up hydrogen is passed by way of conduit 28 into and through a molecular sieve 29 for the removal of water therefrom. In a manner similar to that of the n-butane feed stream one or more additional molecular sieves 31 can be connected in parallel with the molecular sieve 29. The hydrogen passes from molecular sieve 29 into conduit 32 wherein it is admixed with recycled hydrogen containing a small amount of hydrogen chloride from conduit 33. The combined hydrogen stream is passed by way of conduit 34 into conduit 35 wherein it is introduced into the n-butane feed stream from surge tank 21. The resulting admixture is passed into and through a preheater 36 and conduit 37 into a single isomerization reactor 38. Reactor 38 is maintained under isomerization conditions which generally include a temperature in the range of about 300° F. to about 950° F. and a pressure in the range of about 15 to about 1500 p.s.i.a. Reactor 38 contains a suitable isomerization catalyst, for example a catalyst comprising a major portion of alumina, from about 0.01 to about 1 weight percent of platinum and from about 0.1 to about 10 weight percent of combined halogen. The reaction effluent is withdrawn from the reactor by way of conduit 39 and is introduced into reactor product separator 41. The vaporous components of the reaction effluent are withdrawn from separator 41 by way of conduit 33 and constitute the hydrogen recycle stream. The liquid components of the reactor effluent is withdrawn from separator 41 and passed by way of conduit 42 into fractionating column 43. An overhead stream comprising a substantial portion of the methane, ethane and propane introduced into column 43, is withdrawn therefrom by way of conduit 44. A bottoms stream is withdrawn from fractionating column 43 and passed by way of conduit 45 into a fractionating column 46. Isobutane is withdrawn from column 46 by way of conduit 47 as the overhead product. A bottoms stream comprising a portion of the n-butane and higher boiling components is withdrawn from fractionating column 46 by way of conduit 48. A side draw stream comprising n-butane is withdrawn from column 46 and passed by way of conduit 49 into conduit 19 wherein it is admixed with fresh n-butane feed stock and the resulting admixture is introduced into feed surge tank 21.

When a turn around becomes necessary and it is desirable to change the catalyst, valve 51 in conduit 11 and valve 52 in conduit 28 are actuated to a closed position to stop the flow of feed stock, and valve 53 in conduit 37 and valve 54 in conduit 39 are actuated to a closed position to isolate the reactor 38 from the remainder of the system. The various components, such as dryers 13 and 22, molecular sieves 17, 25, 29 and 31, surge tank 21, preheater 36, separator 41 and fractionation columns 43 and 46 can then be opened for inspection, repairs and/or modifications as desired. When the inspection, repairs, and modifications have been completed purge gas comprising dry butane and hydrogen is passed by way of conduits 55 and 56 into conduit 37 upstream of valve 53, through conduit 37 and preheater 36 into conduit 35. A first portion of the purge gas in conduit 35 is passed through surge tank 21, molecular sieves 17 and 25, dryers 13 and 22 and then to a purge vent by way of conduit 57. The second portion of the purge gas in conduit 35 passes through conduit 34 into and through molecular sieves 29 and 31 and is removed from the system by way of conduit 58. A valve 59 is located in conduit 33 adjacent conduit 34 and during purge operations valve 59 is actuated to a closed position. Purge gas is passed through conduits 55 and 61 into conduit 33 upstream of valve 59. The purge gas in conduit 33 passes into the upper portion of separator 41 with a portion of the purge gas passing from separator 41 through conduit 39 to a purge vent conduit 62 located downstream of valve 54. The remainder of the purge gas in separator 41 passes through conduit 42 into fractionators 43 and 46. Purge vent conduit 63 is connected to conduits 44 and 47 by way of conduits 64 and 65, respectively, to permit the venting of a portion of the purge gas from columns 43 and 46. The remainder of the purge gas in column 46 passes through conduit 49 to a purge vent conduit 66. Upon the completion of the purging operation valves in purge conduits 55, 57, 58, 62, 63 and 66 are actuated to a closed position, valves 51 and 52 are actuated to an open position to permit the passage of the feed streams into the system, and valves 53 and 54 are opened thus placing the reactor 38 containing the used catalyst back on stream. The HCl which is contained in the butane feed stream and that which is recycled by way of the hydrogen recycle stream in conduit 33 reacts with any rust formed in the interior of the system. The water formed through the reaction of the HCl with the rust, as well as any moisture remaining in the system following the purging operation, reacts with the used catalyst in reactor 38. After a suitable time which is sufficient for substantially all of the rust to be reacted with HCl and for the resulting water to be reacted with used catalyst in reactor 38, for example, on the order of a week, valves 51, 52, 53 and 54 can be actuated to a closed position thus stopping the flow of the feed streams and isolating the reactor. The spent catalyst can be withdrawn from the reactor by way of conduit means 71. A nitrogen blanket can be maintained in the reactor by passing nitrogen through conduit 72 into and through conduit 39, reactor 38, and conduit 37 to a nitrogen vent conduit 73 located downstream of valve 53. Upon the completion of the removal of the spent catalyst from reactor 38, fresh catalyst can be introduced into the reactor by way of conduit 74. Upon the completion of the introduction of the fresh catalyst valves 51, 52, 53, and 54 can be actuated to an open position thus placing reactor 38 back on stream.

The following example is presented in further illustration of the invention and is not to be construed unduly in limitation thereof.

*Example*

In a butane isomerization system in accordance with the drawing, the time required for the preliminary drying of the system with the dry butane and hydrogen purge gas was 48 hours in both the conventional turn around procedure and the procedure in accordance with the invention. The time required for the pickling operation in a conventional system was 24 hours while the time required for the redrying of the system with purge gas subsequent to the pickling operation required another 24 hours. The pickling and redrying operations are eliminated in the procedure in accordance with the invention. Nine hours were required to cool and purge the reactor in the conventional procedure while eleven hours were required to cool and purge the reactor in the procedure in accordance with the invention. Six hours were required for dumping the used catalyst in both the conventional procedure and the procedure in accordance with the invention. Ten hours were required to load the reactor with the fresh catalyst charge in both procedures. As the catalyst dumping in the conventional procedure was effected during the initial part of the turn around while the catalyst dumping in the procedure in accordance with the invention occurred after turn around, the time for the catalyst dumping in the conventional system will be omitted in a comparison of the total down time after turn around resulting from the conventional procedure and the procedure in accordance with the invention. On this basis the total down time after turn around for the conventional procedure was 115 hours whereas the total down time after turn around for the procedure in accordance with the invention was only 75 hours, a reduction of 40 hours in lost production time. The used catalyst was utilized in the procedure in accordance with the invention for one week and yielded a production of 165 m.g.p.d. of isobutane. At the end of one week the used catalyst was dumped, and fresh catalyst was loaded in the reactor and yielded a production of 185 m.g.p.d. of isobutane. Although a loss of production of 20 m.g.p.d. was encountered for the week of operation with the old catalyst, this loss is more than offset by the net gain of 40 hours in production time at 165 m.g.p.d. resulting in a net gain of 135,000 gallons of isobutane. This increase in the net production of isobutane was in addition to maintaining the effective activity level of the fresh catalyst and increasing the life of the fresh catalyst obtained by utilizing the used catalyst to remove water encountered in the system as a result of the turn around.

While the isomerization process has been described for butane it is applicable to the isomerization of isomerizable organic compounds including paraffins containing 5–12 or more carbon atoms per molecule, for example, n-pentane, n-hexane and the like, cycloparaffins, aromatics, organic acids, alcohol, ethers and the like. While the invention has been described as being particularly applicable to a catalyst system utilizing a catalyst comprising alumina, platinum, and combined halogen, the invention is also applicable to any catalyst system to which water is a poison and particularly to catalyst systems which contain components which react with rust to form water. Also while the invention has been described in the terms of a isomerization process, it is applicable to any catalytic reaction process utilizing a catalyst to which water is a poison, for example, a platformer process.

Reasonable variation and modification are possible within the scope of the foregoing disclosure, the drawing and the appended claims to the invention.

I claim:

1. In a process of conducting a turn around of a catalyst reaction system wherein water is a catalyst poison, the catalyst reaction system contains a component which reacts with rust to form water under the operating conditions of said reaction system, and the catalyst reaction zone contains a used catalyst which it is desired to replace with fresh catalyst comprising isolating the catalyst reaction zone and shutting down the remainder of the reaction system, opening at least a portion of said remainder of the reaction system to the atmosphere, conducting any desired turn around operations, closing said at least a portion of said remainder of the reaction system which has been opened to the atmosphere, passing a purge gas through said remainder of the reaction system; the improvement comprising reestablishing fluid communication between said catalyst reaction zone containing said used catalyst and said remainder of the reaction system, passing the reactants into said catalyst reaction zone and maintaining said catalyst reaction zone under suitable reaction conditions for at least a time sufficient for said component to react with substantially all of the rust formed in said reaction system and for the water formed by the reaction of said component and rust to react with said used catalyst to thereby remove free water from said reaction system, subsequent to the expiration of said sufficient time isolating said catalyst reaction zone and shutting down the remainder of the reaction system, withdrawing said used catalyst from said catalyst reaction zone and introducing fresh catalyst into said catalyst reaction zone, and returning said reaction system to on-stream conditions.

2. A process in accordance with claim 1 wherein said catalyst reaction system is an isomerization system.

3. A process in accordance with claim 2 wherein said catalyst is an alumina-platinum-combined halogen catalyst and said component is hydrogen chloride.

4. A process in accordance with claim 3 wherein said isomerization system is a system for converting n-butane to isobutane.

5. In a process of conducting a turn around of a catalyst reaction system wherein water is a catalyst poison, and the catalyst reaction zone contains a used catalyst which it is desired to replace with fresh catalyst, comprising isolating the catalyst reaction zone and shutting down the remainder of the reaction system, opening at least a portion of said remainder of the reaction system to the atmosphere, conducting any desired turn around operation, closing said at least a portion of said remainder of the reaction system which has been opened to the atmosphere, passing a purge gas through said remainder of the reaction system; the improvement comprising reestablishing fluid communication between said catalyst reaction zone containing said used catalyst and said remainder of the reaction system, passing the reactants into said catalyst reaction zone and maintaining said catalyst reaction zone under suitable reaction conditions for at least a time sufficient for said used catalyst to react with substantially all of the moisture present in said reaction system to thereby remove free water from said reaction system, subsequent to the expiration of said sufficient time isolating said catalyst reaction zone and shutting down the remainder of the reaction system, withdrawing said used catalyst from said catalyst reaction zone and introducing fresh catalyst into said catalyst reaction zone, and returning said reaction system to on-stream conditions.

6. In a process of conducting a turn around of a catalyst reaction system wherein water is a catalyst poison, and the catalyst reaction zone contains a used catalyst which it is desired to replace with fresh catalyst, comprising shutting down said reaction system, opening at least a part of said reaction system to the atmosphere, conducting any desired turn around operations, and closing said at least a part of said reaction system which has been opened to the atmosphere; the improvement comprising returning said reaction system to on-stream conditions with said used catalyst, maintaining said catalyst reaction zone under suitable reaction conditions for at least a time sufficient for said used catalyst to react with substantially all of the water present in said reaction system to thereby remove free water from said reaction system, subsequent to the expiration of said sufficient time shutting down the reaction system, withdrawing said used catalyst from said catalyst reaction zone and introducing fresh catalyst into said catalyst reaction zone, and returning said reaction system to on-stream conditions.

References Cited by the Examiner

UNITED STATES PATENTS

| 2,902,434 | 9/1959 | Burton et al. | 208—154 |
| 2,952,611 | 9/1960 | Haxton et al. | 208—65 |
| 3,180,905 | 4/1965 | McDonald et al. | 260—683.74 |

DELBERT E. GANTZ, *Primary Examiner.*

R. H. SHUBERT, *Assistant Examiner.*